July 28, 1936.   G. H. HUFFERD   2,049,163
THREADED JOINT
Filed Feb. 26, 1934
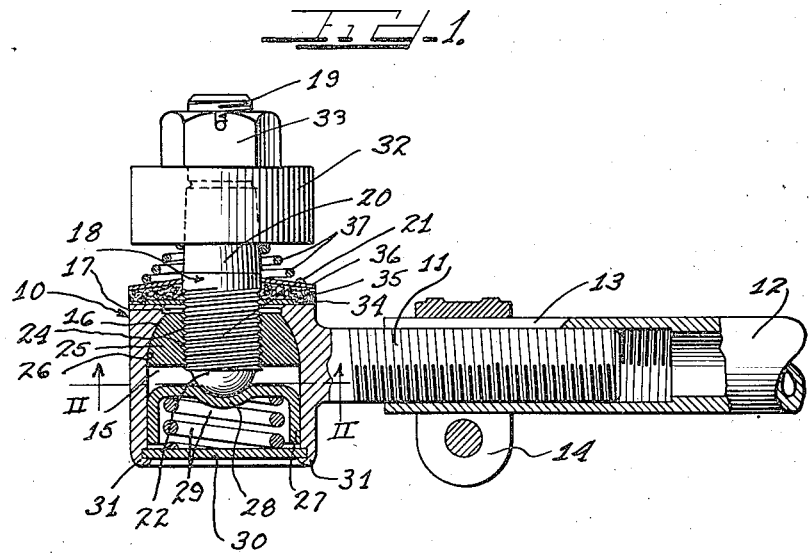
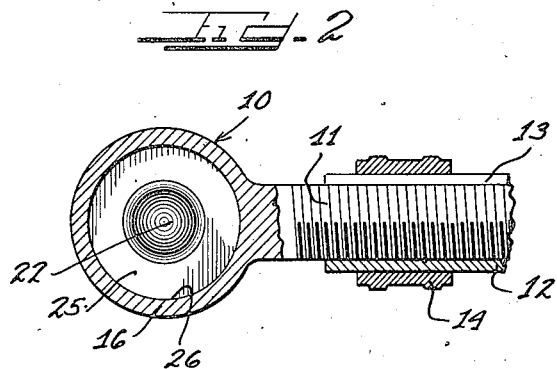
Inventor
George H. Hufferd.
by Charles H. Will Attys.

Patented July 28, 1936

2,049,163

UNITED STATES PATENT OFFICE 2,049,163

THREADED JOINT

George H. Hufferd, Detroit, Mich., assignor to Thompson Products, Incorporated, Cleveland, Ohio, a corporation of Ohio Application February 26, 1934, Serial No. 712,902

10 Claims. (Cl. 287—90)

This invention relates to joints such as are used in tie rod and drag link connections for automotive vehicles.

More specifically, this invention relates to tie rod joints having the stud member in screw thread relation with a seating member.

The tie rod joints of the prior art have generally included stud elements having rounded ball ends which are movable against spherical bearing surfaces. These ball joints are expensive to manufacture, since they require an accurate fitting of the stud ball end in a spherical seating element.

I have now provided a novel type of joint having the same free movement of the prior art ball joint and having, in addition, a stronger construction that is capable of withstanding repeated stresses and forces of unequal nature. The joints of this invention do not require the forming of accurate ball ends on the studs and are so constructed that rotary movement of the stud about its own axis is borne by separate bearing surfaces from those permitting the angular or tilting movements.

According to my invention, the stud of the joint is threaded through a seating element having an outer segmental spherical surface for cooperating with the inner segmental spherical surface of the joint housing. The rotary movement of the stud about its own axis is permitted by free rotation of the stud in the threads of the seating element, while any angular or tilting movement is permitted by the cooperating segmental spherical bearing surfaces.

It is therefore an object of this invention to provide a joint having free rotary movement on threaded surfaces and free angular movement on smooth bearing surfaces.

Another object of this invention is to provide a tie rod joint having a stud in screw thread relation with a seating element.

Another object of this invention is to provide a strong, durable tie rod joint having free rotary and angular movements which is cheaper to construct than tie rod ball joints.

A further object of this invention is to provide a tie rod joint in which rotary movements of the stud about its own axis are borne by threaded surfaces.

Other and further objects of this invention will be apparent to those skilled in the art from the following detailed description of the accompanying drawings, illustrating a preferred embodiment of the invention.

On the drawing:

Figure 1 is a cross-sectional view, with parts in elevation, of a tie rod end embodying the joint of this invention.

Figure 2 is a cross-sectional view, with parts in elevation, taken substantially along the line II—II of Figure 1.

As shown on the drawing:

The reference numeral 10 indicates generally the socket element or housing for the joint of this invention having an integral, laterally extending shank 11 threaded into a tie rod or other link connection 12. The link 12 is slotted, as shown at 13, so that the shank 11 may be secured in the link 12 in properly adjusted position by means of a clamp 14 which is capable of compressing the link 12 tightly against the shank 11.

The housing 10 has an opening 15 extending therethrough. The upper end of the opening 15 is provided with a segmental spherical bearing surface 16 extending inwardly to define, at its top, an annular opening 17, through which a stud 18 extends freely.

The stud 18 is composed of a top threaded portion 19, an intermediate tapered portion 20, a lower threaded portion 21, and a segmental spherical end 22.

The threaded portion 21 of the stud 18 is in screw thread relation with the threaded axial bore 24 of a seating element 25, having an outside segmental spherical bearing surface 26. The outside spherical surface 26 of the seat element 25 cooperates with the inside spherical bearing surface 16 of the housing 10.

A dished cap member 27 having a depressed spherical portion 28 for receiving the rounded end 22 of the stud member is fitted into the opening 15 and urged against the rounded stud end 22 by a compressed coil spring 29 retained in the cap 27 by a cover plate 30. The cover plate 30 is secured in the housing by peening the ends of the housing over the cover plate, as shown at 31. In this manner, the cap 27 is constantly urged against the rounded end 22 of the stud 18. Since the stud extends freely through the opening 17 in the housing, the seating element 25 which is in screw thread relation with the stud is maintained in proper assembled position against the inner bearing surface 16 of the housing.

The tapered portion 20 of the stud is adapted to receive a link connection 32. The link connection 32 is held on the stud by means of a nut 33 threaded on the threaded portion 19 of the stud.

The annular opening 17 at the top of the stud housing may be sealed to prevent loss of lubricant and ingress of dirt by means of a washer 34 placed around the stud 18 and mounted on top of the housing 10. A felt washer 35 having the same diameter as the joint housing is placed over the washer 34. A metal cap member 36 is next placed over the felt washer 35. The metal cap 36 is preferably tapered, as shown, for receiving a tapered coil spring 37 which is compressed between the link connection 32 and the metal cap 36 for holding the seal in position and also for permitting free movement of the stud in the housing.

The threaded bearing surface between the seating element 25 and the stud portion 21 provides considerably more bearing surface than generally exists between the stud and seating member of the prior art joints. The threaded connection between the stud and the seating element facilitates lubrication of the joint since lubricants will readily follow the threads. The threaded type of joint construction also obviates the expense of machining an accurate ball end on the stud. Furthermore, the seat element may be formed from a different metal than that used in forming the stud. This is advantageous because it is necessary to impart stress and shock resisting properties to the stud, while the seating element should be quite hard to resist wear of the bearing surfaces frictionally engaging the housing.

The spring urged cap 28 always maintains the bearing surfaces in proper seated relation and automatically compensates for wear of these surfaces. The stud may be raised and lowered in the threaded seating element without ever permitting the seating element to become loose in the housing, since the cap 28 will always follow the ball end 22 of the stud and force the seating element 25 into proper engagement with the housing.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A joint comprising a housing having an opening therethrough and provided with an inside segmental spherical bearing surface near one end thereof, a seating element having an outside segmental spherical bearing surface for engaging with said housing bearing surface and having a threaded bore extending therethrough, a stud threaded in the bore of said seating element, a rounded end on said stud, and spring urged means engaging said rounded end for holding said stud and seating element in assembled relation.

2. In a tie rod joint, in combination, a stud having threaded portions on each end thereof, a tapered intermediate portion between said threaded portions, a rounded end on said stud, a seating element adapted to engage said stud in screw thread relation at one end thereof, a housing having an inside bearing surface for receiving said seating element and means in said housing urged against the rounded end of said stud to hold the stud and seating element in assembled relation.

3. In a joint, a cup shaped housing having a bearing surface therein and an aperture extending through the bottom of the cup, a seating element tiltable in the housing having an outside bearing surface cooperating with the inside bearing surface of said housing and a threaded inside bearing surface, a stud in said housing extending freely through said aperture and having a threaded portion in screw thread relation with the inside threaded portion of said seating element and means for holding said seating element and stud in operative position in the housing.

4. A joint comprising a socket having a bore extending therethrough with a segmental spherical bearing portion at one end thereof defining a restricted opening thereto, an annular seating element in tiltable bearing relation with said bearing portion, a stud threaded through said seating element and extending freely through the restricted opening in the socket, said stud having a rounded end extending into the space defined by the bore in the socket, a dished cap member slidable in said bore having a centrally depressed portion adapted to receive the rounded end of said stud, a closure plate for said socket and spring means held under compression between said plate and said cap to urge the cap against the rounded end of the stud and maintain constant bearing relation between the bearing surfaces of said stud, seating element and socket.

5. In a joint, a socket having an internal bearing surface, a stud projecting from said socket in free tiltable and rotatable relation thereto and having a bearing element associated therewith in bearing relation with the socket bearing surface, the end of said stud having a segmental spherical surface disposed in the socket of substantially less diameter than the bearing element, a dished cap member in slidable engagement with the socket walls having a segmental spherical center portion conforming with said segmental spherical surface on the end of the stud and a spring member encased in said dished cap member and held under compression therein for urging the cap member toward the stud end to seat the segmental spherical surface of the cap member against the segmental spherical surface of the stud end and maintain the joint elements in assembled relation.

6. In a joint, a socket having a bore extending therethrough and a converging bearing surface on one end of said bore defining a restricted opening through said socket, a stud extending through said opening in free rotatable and tiltable relation to said socket and having a bearing associated therewith, said bearing being provided with an outer bearing surface converging in the same general direction as the bearing surface in the socket and cooperating therewith, the end of said stud being provided with a segmental spherical surface of smaller diameter than the bearing, a cap member having a surface in engagement with said segmental spherical surface of the stud end, said cap member having a depending skirt portion in sliding engagement with the socket wall defining the bore and a spring member encased by said cap member for urging the cap member in the direction of convergence of said bearing surfaces of the socket and bearing to maintain the joint elements in assembled relation.

7. In a joint, a socket member having an internal bearing surface, a stud extending from said socket and having a bearing surface thereon, a seating element disposed around said stud bearing surface, said seating element having an outside bearing surface for seating in the bearing surface of the socket, said bearing surface of the socket and outside bearing surface of the seating element converging in the same general direction, the end of said stud being provided with a segmental spherical surface of smaller diameter than the seating element, a cap member having a depending skirt portion in slidable engagement with the socket wall and having a conforming segmental spherical surface in engagement with the segmental spherical surface of the stud end, a coil spring encased in said cap member and a closure plate for said socket to hold said coil spring under compression and urge said cap member into contact with the stud end for maintaining the joint elements in assembled relation.

8. In a joint, a socket member having an internal segmental spherical bearing surface therein, a stud extending from said socket and having a bearing surface thereon, a seating element disposed around said bearing surface of the stud and having an outside segmental spherical bearing surface cooperating with the socket bearing surface, a rounded end on said stud of substantially less diameter than the seating element, a cap member having a depressed central portion for receiving said rounded end of the stud and having a depending skirt portion in slidable engagement with the socket wall, a coil spring encased in said cap member, and a closure plate for said socket to hold said coil spring under compression and urge said cap member into contact with the rounded end of the stud for maintaining the joint elements in assembled relation.

9. A joint comprising a socket having a bore extending therethrough with a segmental spherical bearing portion at one end thereof defining a restricted opening thereto, an annular seating element in tiltable relation with said bearing portion, a stud threaded through said seating element and extending freely through the restricted opening in the socket, the end of said stud having a segmental spherical surface disposed in the socket, a dished cap member slidable in the bore of the socket having a segmental spherical central portion conforming with the segmental spherical surface on the stud end and adapted to engage said surface, a closure plate for said socket and spring means encased in said cap member and held under compression between said cap and said plate to urge the cap toward the stud end for maintaining the joint elements in constant bearing engagement.

10. A joint comprising a housing having a bore extending therethrough, a portion of the wall of said bore providing a segmental spherical bearing surface, a stud having a threaded end extending into said bore, a seating element having a threaded opening therethrough for receiving said threaded end to permit relative turning and axial movement therebetween and having an outer bearing surface in contact with and conforming to said housing segmental spherical bearing surface to permit relative tilting movement between said stud and housing, a member axially movable in said bore, said stud end and member having cooperating surfaces capable of limited universality of relative movement, and resilient means constantly urging said member into contact with said stud end to compensate for relative axial movement between said stud and seating element and to urge said seating element into closer contact with said housing bearing surfaces.

GEORGE H. HUFFERD.